US006161284A

United States Patent [19]

Glanfield et al.

[11] Patent Number: 6,161,284

[45] Date of Patent: Dec. 19, 2000

[54] METHOD FOR IMPROVED SERVICE OF ENGINE MOUNTED ACCESSORIES

[75] Inventors: Ian S. Glanfield, LaSalle, Canada; Jerry P. Harkey, Bloomfield Hills, Mich.

[73] Assignee: Chrysler Corporation, Auburn Hills, Mich.

[21] Appl. No.: 09/385,172

[22] Filed: Aug. 30, 1999

Related U.S. Application Data

[62] Division of application No. 09/017,970, Feb. 3, 1998, Pat. No. 6,089,833.

[51] Int. Cl.[7] .......... B23D 6/00

[52] U.S. Cl. .......... 29/888.011; 29/402.08; 29/402.03

[58] Field of Search .......... 29/888.011, 402.03, 29/402.08; 123/41.11; 74/63–69; 474/19–192; 417/362

[56] References Cited

U.S. PATENT DOCUMENTS 3,741,025 6/1973 Russell .......... 74/230.4
4,694,660 9/1987 Gannaway .......... 62/196.4
5,409,350 4/1995 Mitchell .
5,537,956 7/1996 Pennfield et al. .

*Primary Examiner*—I Cuda Rosenbaum
*Attorney, Agent, or Firm*—Kenneth H. Maclean

[57] ABSTRACT

Coolant pump service in a crowded engine compartment is provided by forming the side wall of the pump drive pulley with a centralized and radially lobed opening which can accommodate the radial arms of the drive hub that are normally connected by screws to the pulley side wall. The drive hub is fixed to the outboard end of the coolant pump drive shaft that extends through the housing of the pump that is removably secured by screws to the block of an internal combustion engine. The pump impeller is mounted on the inboard end of the drive shaft for fluid pumping operation in a coolant-receiving cavity in the coolant circuit of the engine. In the event of interference, which prevents or hampers the removal of the pulley axially from the drive shaft, the hub screws are removed and the pulley is turned into alignment with the lobes of the opening so that the pump housing screws are accessible. These screws are then removed so that the pump can be manually removed from the clearance between the engine and the frame side rail or other interfering component.

4 Claims, 5 Drawing Sheets

METHOD FOR IMPROVED SERVICE OF ENGINE MOUNTED ACCESSORIES

CROSS-REFERENCES TO RELATED APPLICATIONS

This application is a division of application Ser. No. 09/017,970, filed Feb. 3, 1998 by the same inventors as in the present application now U.S. Pat. No. 6,089,833.

BACKGROUND OF THE INVENTION

1. Field of the Invention

This invention relates to drive pulleys for augmenting service of associated belt-driven accessories mounted on the engine in crowded vehicle engine compartments and more particularly to a new and improved drive pulley and pulley hub for the liquid coolant pump operatively mounted on the engine block that allows the pulley to be disconnected from the drive hub and displaced inboard to a position on the pump housing to provide ready access to pump attachment screws for augmenting their removal and removal of the pump from the block of the engine.

2. Description of Related Art

Prior to the present invention, various coolant pump designs for internal combustion engines have been devised to provide effective engine cooling during a wide range of engine operations. U.S. Pat. No. 5,537,956 issued Jul. 23, 1996 for "Coolant Circuit" and U.S. Pat. No. 5,409,350 issued Apr. 25, 1995 for "Water Pump Bearing and Seal Cartridge" as well as the "Cooling System" shown in the Figure on page 346 of Auto Service and Repair, c. 1984, by the Goodheart—Wilcox Co. Inc., exemplify such designs. While these prior designs generally meet their design objectives, they do not address new and higher standards for improved coolant pump service in crowded spaces particularly in an engine transversely mounted in an accessory packed engine compartment found in many modern automobiles with front wheel drives.

BRIEF SUMMARY OF THE INVENTION

The belt driven pulley of an accessory operatively mounted on the engine as set forth in this invention is readily removed from driving connection with the pulley hub and connected drive shaft of the accessory even though it may be in close quarters in a crowded engine compartment of a vehicle. With the pulley free, the retention screws holding the accessory to the engine are accessible and removed so that the accessory can be removed. More particularly, in some installations, the tight clearance between the outboard end of the coolant pump housing and a side rail of the vehicle frame with a transversely mounted engine hinders or precludes the ready disconnect and removal of the coolant pump pulley and subsequent removal of the pump from the engine block for service or replacement. This is remedied in the present invention by providing the side wall of the pulley with a multi-lobed opening which provides a window allowing the through passage of the separate pulley hub with its radial arms after their disconnect from the side wall of the pulley. With this invention, the following method steps may be employed for pump service. The pulley may be released from its hub by suitable tooling and is subsequently turned until the arms of the hub are aligned with the opening in the pulley. The pulley is then axially moved over the pulley hub and onto the coolant pump housing to provide access to the retention screws securing the pump body to the engine. After removal of the pump body retention screws, the pump can be axially withdrawn from the engine block and moved with the pulley telescoped aboard into the clearance between the engine and side rail and subsequently from the clearance to a completely free position for pump service or for pump replacement.

In this invention the new and improved pulley and its associated pulley hub can be readily employed with a wide range of coolant pump designs or with other accessories since little or no modifications of the pulley driven components are required.

These and other features, objects and advantages of the present invention will become more apparent from the following drawings, descriptions and specifications.

DETAILED DESCRIPTION

Figure 1:
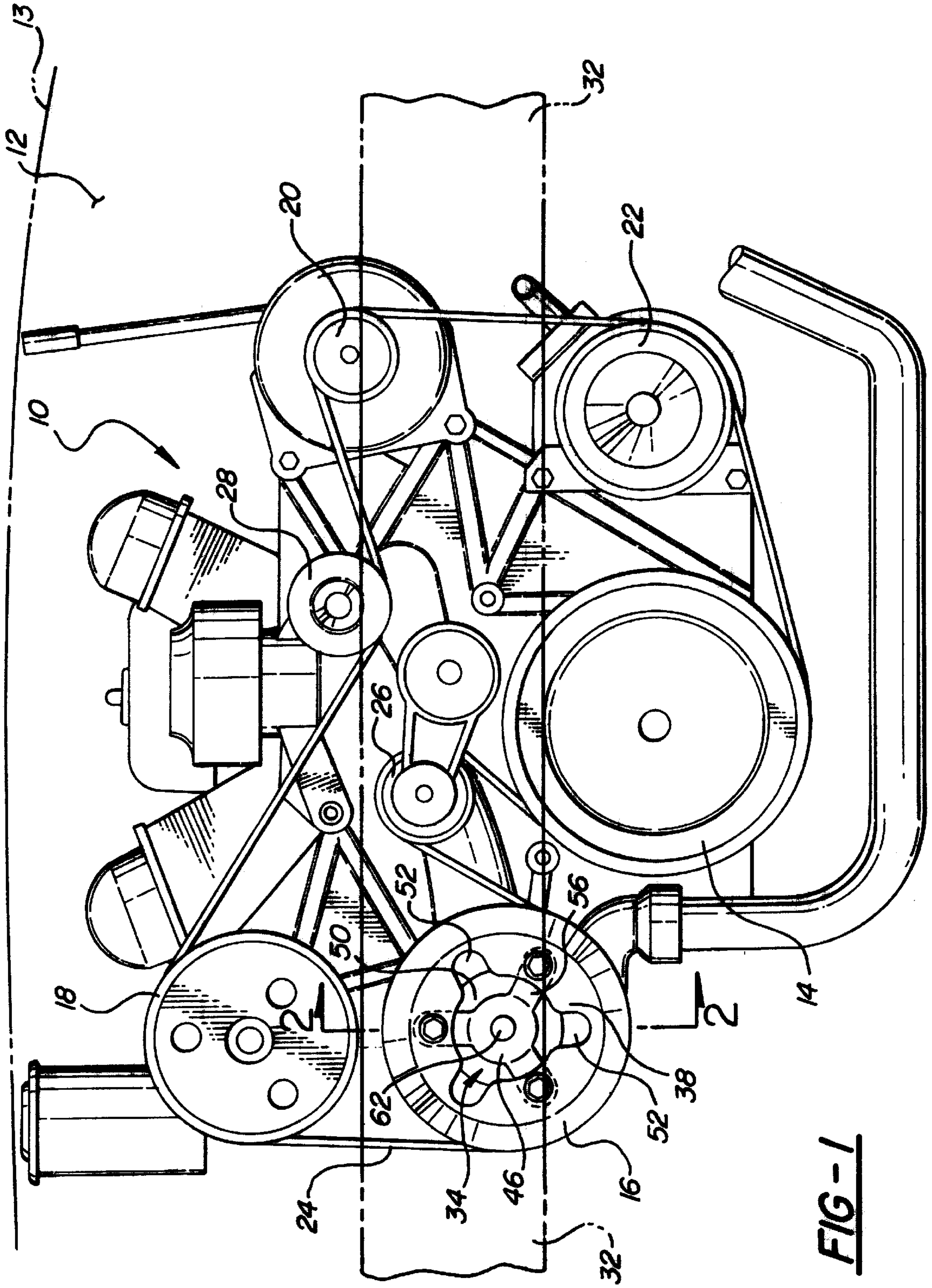
FIG. 1 is an end elevation view of an internal combustion engine transversely mounted in the engine compartment of an automotive vehicle.

Turning now in detail to the drawing FIG. 1 illustrates in side view an automotive internal combustion engine 10 as operatively mounted in the engine compartment 12 of an automotive vehicle. The engine compartment hood is represented by the dashed line 13. The engine 10 powers an accessory system drive pulley 14 driven through the engine crankshaft which in turn drives an coolant pump drive pulley 16, an air conditioner compressor drive pulley 18, a generator drive pulley 20 and a power steering gear pump drive pulley 22. The rotational drive for these pulleys is through a drive belt 24 routed in a serpentined and endless path around pulleys 16, 18, 20, and 22 and around belt tensioning pulley 26 and idler wheel 28.

Figure 2:
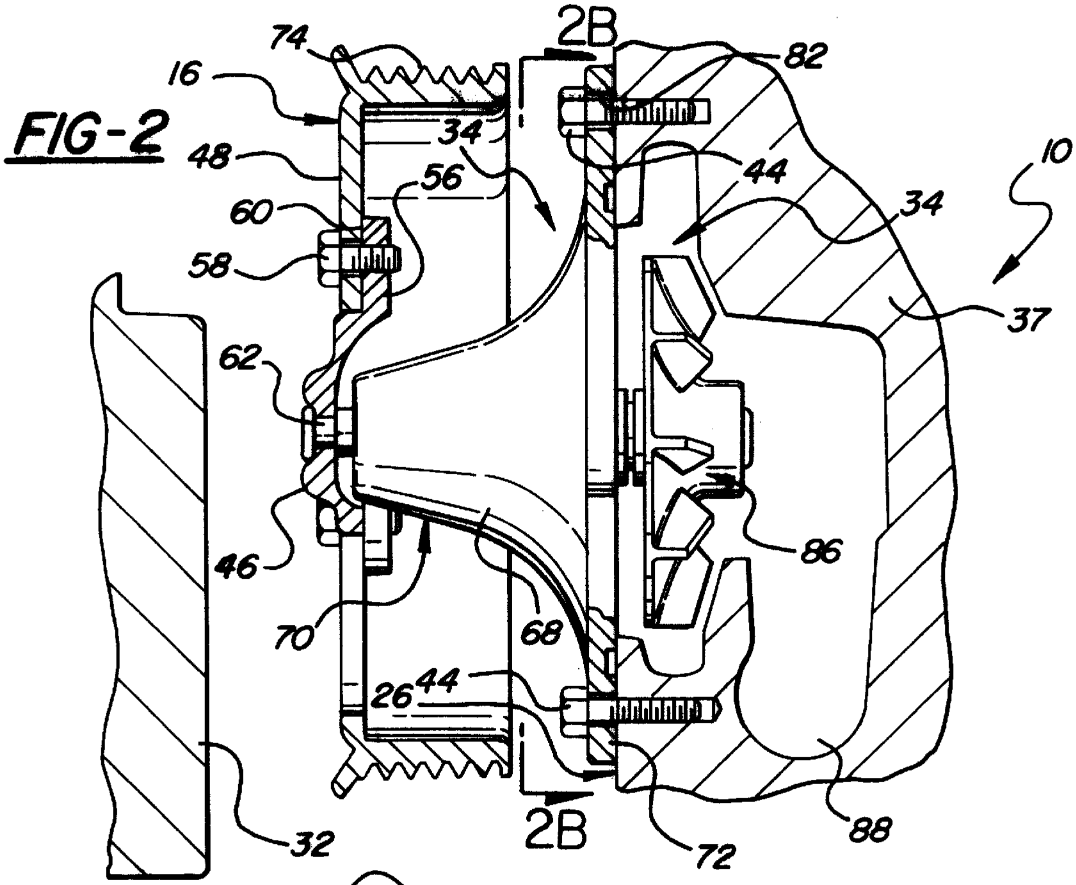
FIG. 2 is a cross sectional view taken generally along sight lines 2—2 of FIG. 1 illustrated with a portion of the side rail of the vehicle.
Figure 2A:
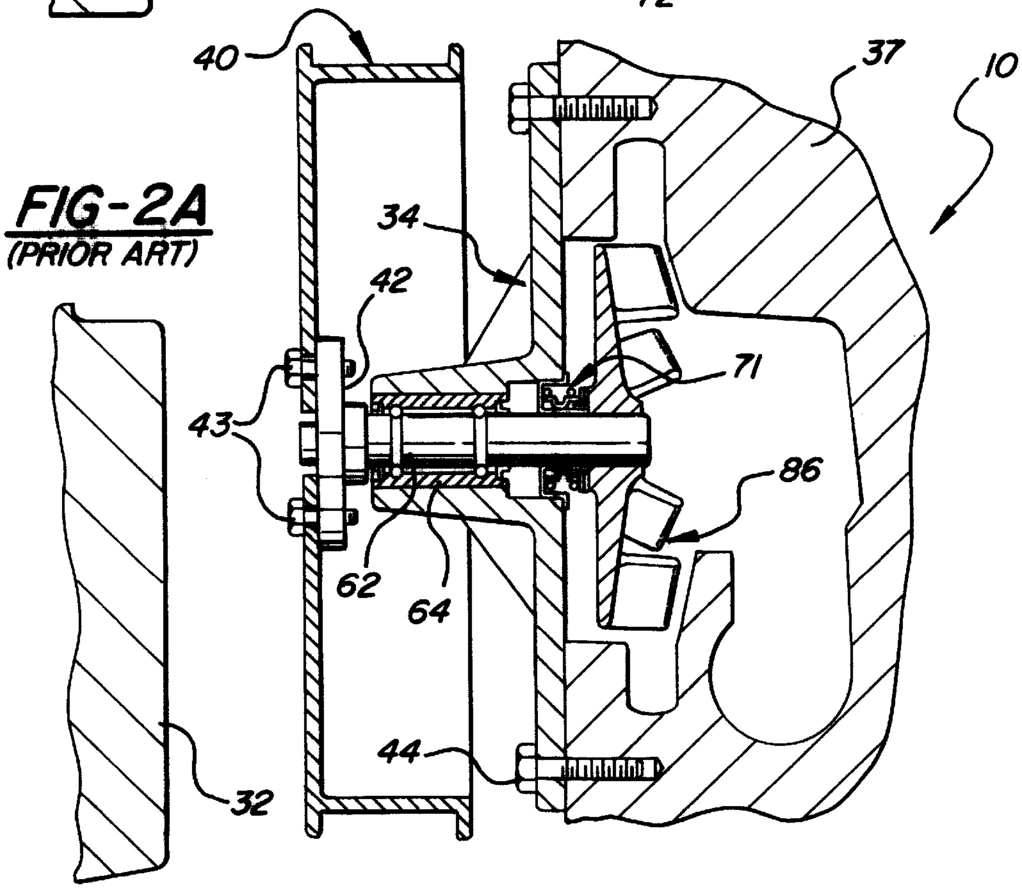
FIG-2A (PRIOR ART)
FIG.2*a* is a view similar to the view of FIG. 2 but showing a prior art construction.
Figure 3:
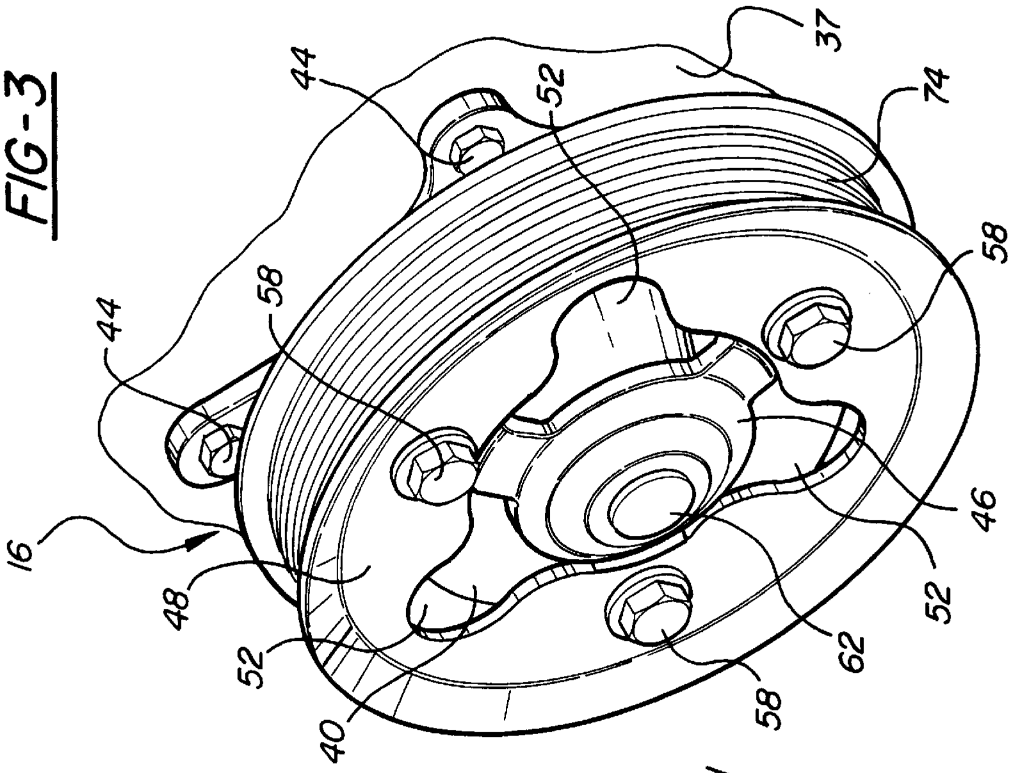
FIG. 3 is a pictorial view of the pulley construction of FIG. 2.

The side rail 32 of the frame of the vehicle is outboard of and so close to the coolant pump drive pulley 16 that only tight clearance is available for service of the engine-mounted coolant pump 34 and its drive pulley 16. FIG. 2*a* illustrates service problems related to such tight clearances in which the clearance 36 between the block 37 of engine 10 and the adjacent side rail 32 is not adequate to allow the ready removal of a prior drive pulley 40 from the prior pump drive hub 42 and the subsequent removal of the pump 34 from the engine block for pump replacement or service.

With such prior construction there is initial difficulty in accessing and removing the screws 43 attaching the pulley 40 to the pulley hub 42. Moreover, since the prior pulley 40 covers the pump 34, the screws 44 attaching the pump 34 to the engine block are not readily accessible for their removal so that the pump cannot be easily removed from the engine block.

In this invention, however, removal of the pump pulley from the pulley hub, and more importantly, the subsequent removal of the pump from the engine is augmented by the improved method of pump service and by the design of the pump pulley 16 and the associated pulley hub 46 best illustrated in FIGS. 1–5. In the preferred embodiment of this invention, the outer side 48 of the pulley 16 is formed with a generally circular opening 50 enlarged by three radial and arcuately spaced lobed openings 52. This enlarged opening is designed to match, with clearance, the pulley hub 46 with its three radial and arcuately spaced arms 56 each drivingly connected to the coolant pump pulley 10 by screws 58. As shown best in FIGS. 2, 4 and 5, the end portions of each of the radial arms is stepped in an inboard direction to provide offset seat 60 for improved seating and attachment of the pulley to the hub. This offset seat construction and the inwardly offset side 48 of the pulley effectively moves the pulley-hub attachment in an inboard direction closest to the engine 10 providing increased clearance for tooling to access screws 58.

Figure 4:
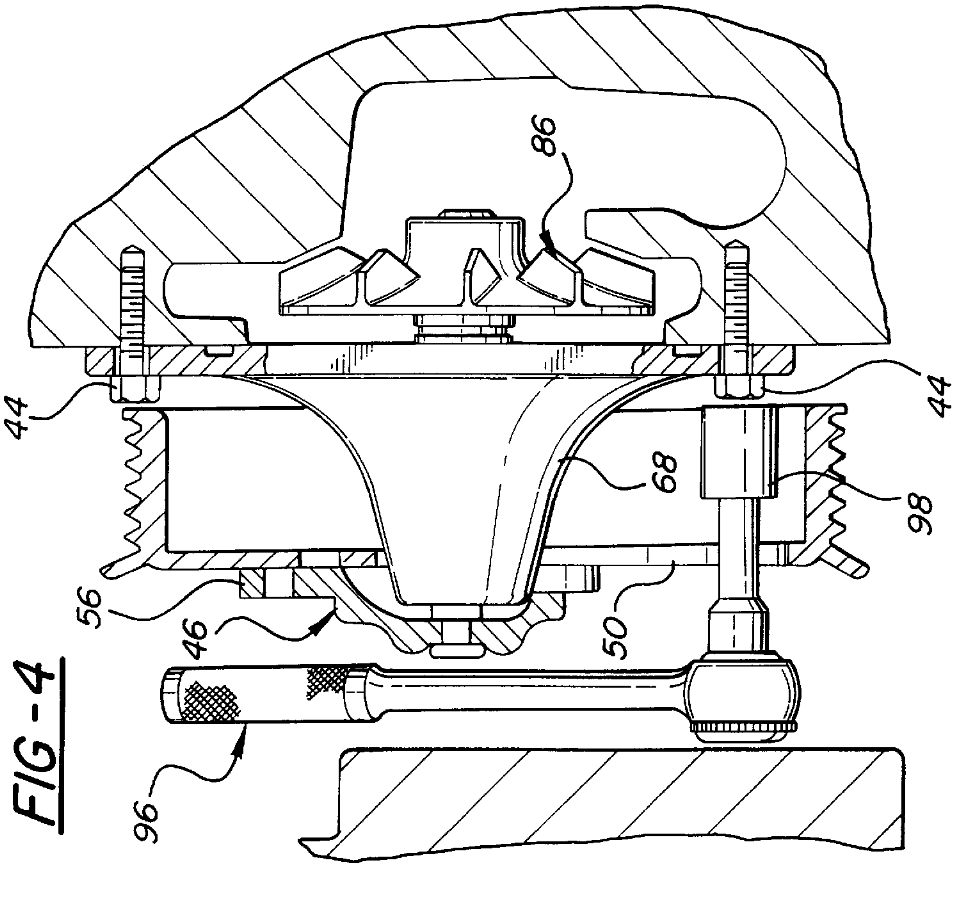
FIG. 4 is a view similar to that of FIG. 2 but showing the water pump being disconnected from the engine block.

The pulley hub 46 is drivingly secured to the outboard end of the pump drive shaft 62 that is rotatably mounted by bearing 64 in an axial bore 66 formed in the generally conical and laterally extending hub portion 68 of the body of the pump or housing 70. A fluid seal 71 operatively mounted in the inboard end of the bore fluid seals to the drive shaft and prevents fluid leakage from the pump 34. The conical hub portion 68 extends from a flattened base portion 72 of the housing into the confines of the pulley 16 as defined by the multi-grooved cylindrical rim 74 of the pulley and its side 48 as best shown in FIGS. 2 and 4.

Figure 2B:
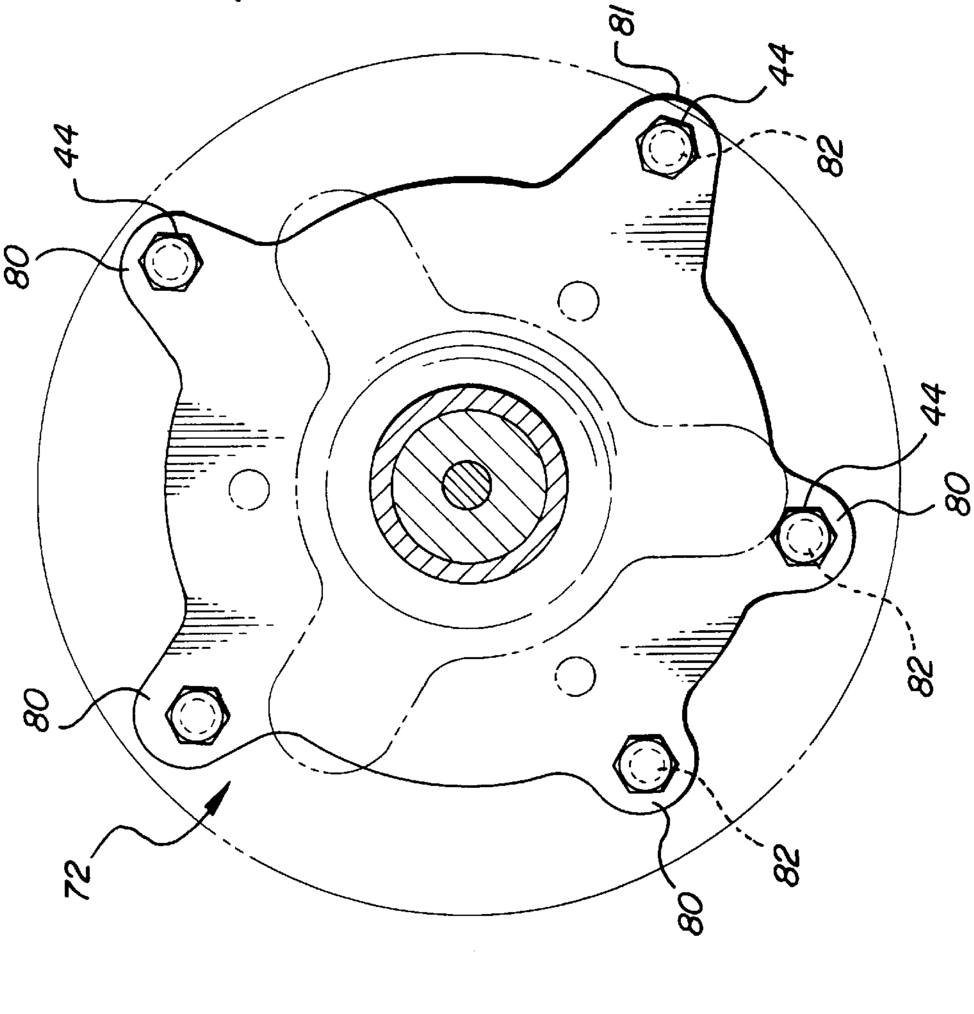
FIG. 2*b* is a cross-sectional view taken generally along lines 2*b*—2*b* of FIG. 2.
Figure 5:
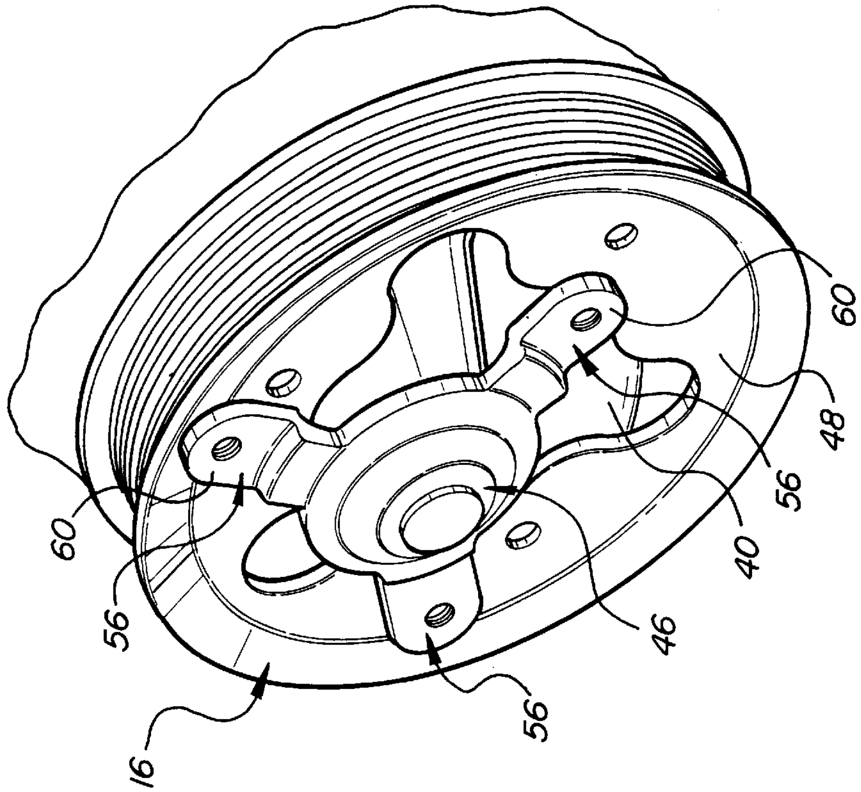
FIG. 5 is a pictorial view of the disconnected water pump pulley of FIG. 4.

As shown best in FIG. 2*b*, the base portion 72 of the housing has radially extending and arcuately spaced attachment ears 80, 81 formed with openings 82 that receive screws 44 that secures the pump housing 70 to the block of the engine.

The pump 34 further comprises a multi-bladed impeller 86 secured to the inner end of the drive shaft 62 which is disposed in a pumping cavity 88 formed in the block of the engine that is part of the engine coolant circuit. With this construction, the rotation of the pulley 16 by the drive belt will effect rotation of the impeller to circulate coolant in the circuit for engine and component cooling purposes as well as for the selective heating of the occupant compartment of the vehicle.

Figure 6:
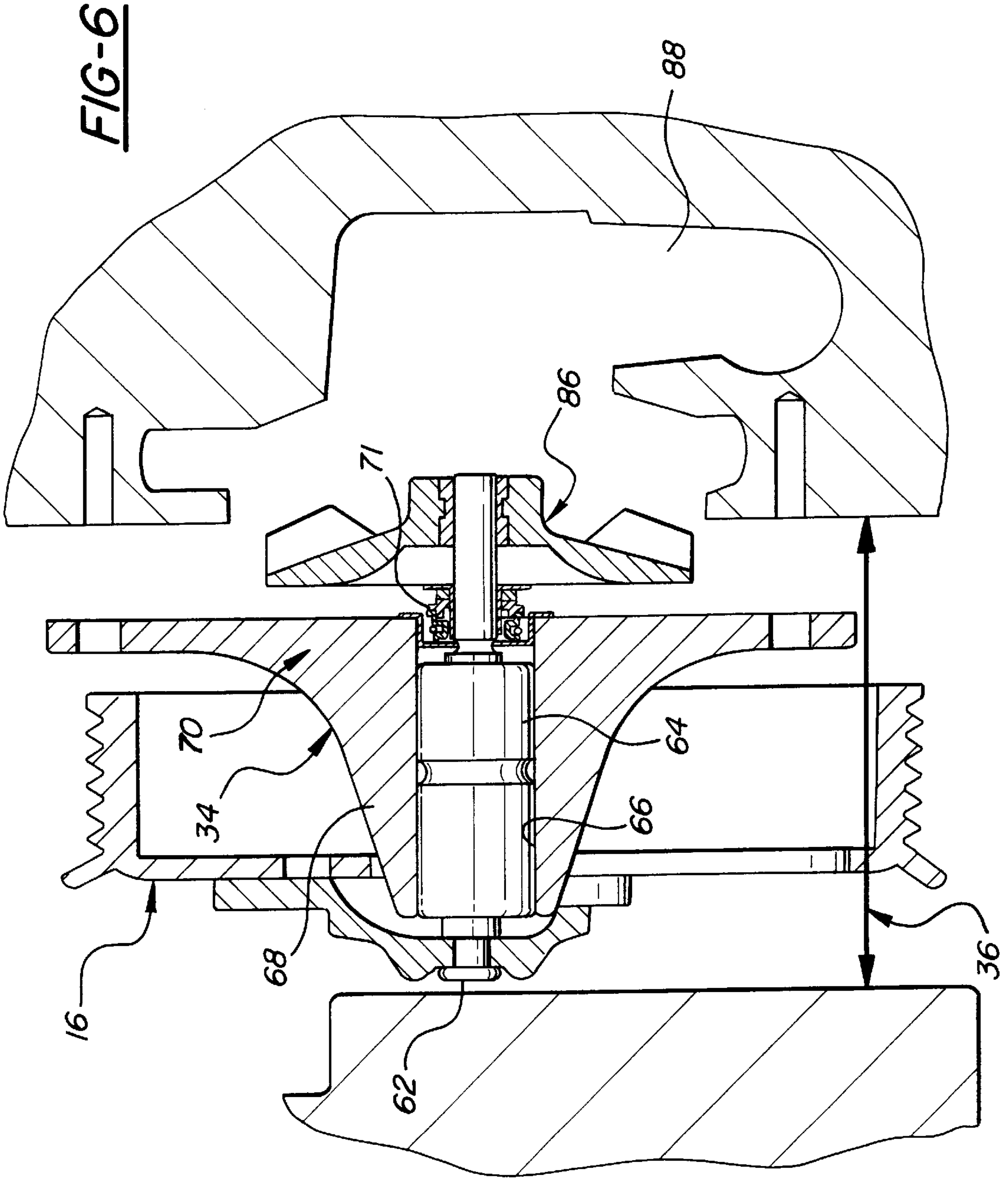
FIG. 6 is a cross sectional view similar to FIG. 2 but showing the removal of the water pump and pulley from the engine.

For service of the coolant pump 34 the screws 58 securing the pulley 16 to the pulley hub 46 are accessed. This can be readily accomplished by removing the drive belt 24 from the rim or periphery of the pulley and turning the pulley until each of the pulley hub screws 58 is moved to their most accessible position with respect to the side rail 32. This position is shown in FIG. 2 in which upper screw 58 is accessible. This screw is removed and the pulley is turned in index fashion so that the other two screws are accessed and in turn removed. After of the screws 58 are removed, the pulley 16 is turned to effect alignment of the lobes of the opening 52 with the radial arms 56 of the hub 46. On such alignment, the pulley 16 is axially displaced in an inboard direction so that the pulley hub 45 passes through the window provided by the opening 50 in the pulley and onto the conical hub portion 68 of the pump housing as shown best in FIGS. 4 and 5. Tools such as the ratchet 96 and socket 98 can then be inserted through the lobed opening in the side 48 of pulley 16 to remove the screws 84 holding the pump housing to the engine block. After removal of the screws 44, the pump 34 with the pulley 16 telescoped aboard are axially withdrawn and moved into the clearance 36 between the side rail 32 and the engine block, shown in FIG. 6. The components can be subsequently moved into a free work area for pump repair. The serviced or replacement pump can be easily reinstalled by reversing the service steps outline above.

While a preferred embodiment of the invention has been shown and described, other embodiments will now become apparent to those skilled in the art. Accordingly, this invention is not to be limited to that which is shown and described but by the following claims.

What is claimed is:

1. A method of removing a rotary device from an internal combustion engine for service or replacement that is mounted in a crowded engine compartment of an automotive vehicle in which the rotary device has a housing releasably secured by screws to the block of the engine and including a drive shaft rotatably driven by an accessory belt driven pulley disposed adjacent to a component of the vehicle that blocks removal of the pulley in a direction toward the component, the pulley being drivingly connected to the drive shaft through the intermediary of a pulley hub releasably connected by hub connector screws to the side of the pulley comprising the steps of:

a. removing the drive belt from operative engagement with the pulley, b. disconnecting the pulley from the pulley hub while it is mounted on said shaft, c. moving the disconnected pulley in a direction away from said component and over said pulley hub and onto the housing of said rotary device, d. accessing the screws holding the housing on the block of the internal combustion engine through the central opening the side of the pulley, e. removing the housing retainer screws, f. separating the rotary device housing with the pulley aboard from the block of the internal combustion engine, and g. moving the rotary device from the confined space of the engine compartment for replacement purposes.

2. A method of removing a coolant pump from an internal combustion engine for service or replacement that is mounted in a crowded engine compartment of an automotive vehicle in which the pump has a housing releasably secured by screws to the block of the engine and in which a pump impeller drive shaft is rotatably driven by an accessory belt driven pulley disposed adjacent to a component of the vehicle that blocks removal of the pulley in a direction toward the component, the pulley being drivingly connected to the drive shaft through the intermediary of a pulley hub releasably connected by hub connector screws to the side of the pulley comprising the steps of:

a. removing the drive belt from operative engagement with the pulley, b. disconnecting the pulley from the pulley hub while it is mounted on said pump shaft, c. moving the disconnected pulley in a direction away from said component and over said pulley hub and onto the housing of said pump, d. accessing the screws holding the pump housing on the block of the internal combustion engine through the central opening the side of the pulley, e. removing the housing retainer screws, f. separating the pump housing with the pulley aboard from the block of the internal combustion engine, h. moving the pump from the confined space of the engine compartment for pump replacement purposes.

3. The method set forth in claim 1, wherein said side of said pulley has an enlarged centralized opening with radially spaced windows therethrough and wherein said pulley hub has a plurality of radial arms operatively connected to the side of said pulley and further comprising the step of turning the pulley to align the radial windows in the side of said pulley with the radial arms of said hub and then axially moving the pulley over said hub onto said housing and the additional step of accessing the screws of said housing through said centralized opening with tools and removing said screws to allow said housing to be removed.

4. The method set forth in claim 2, wherein said side of said pulley has an enlarged centralized opening with radially spaced windows therethrough and wherein said pulley hub has a plurality of radial arms operatively connected to the side of said pulley and further comprising the step of turning the pulley to align the radial windows in the side of said pulley with the radial arms of said hub and then axially moving the pulley over said hub onto said housing and the additional step of accessing the screws of said housing through said centralized opening with tools and removing said screws to allow said housing to be removed.

* * * * *